Jan. 23, 1968     L. O. LUNDIN ET AL     3,365,013
STEERING DEVICE FOR TRACK-LAYING VEHICLES

Filed Sept. 1, 1965     2 Sheets-Sheet 1

INVENTORS
LARS OLOF LUNDIN
NILS OLOV JOHANSSON
BY
ATTORNEYS

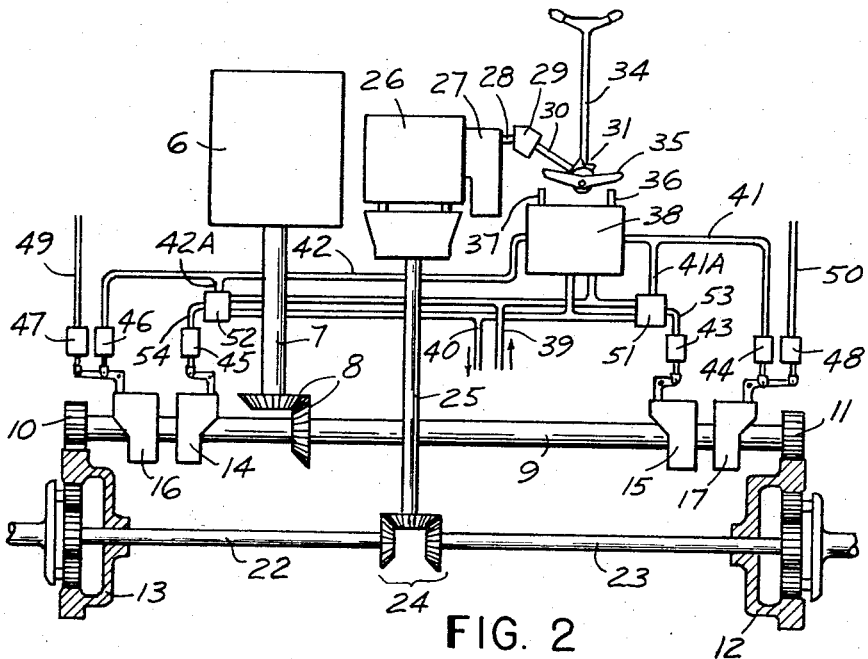
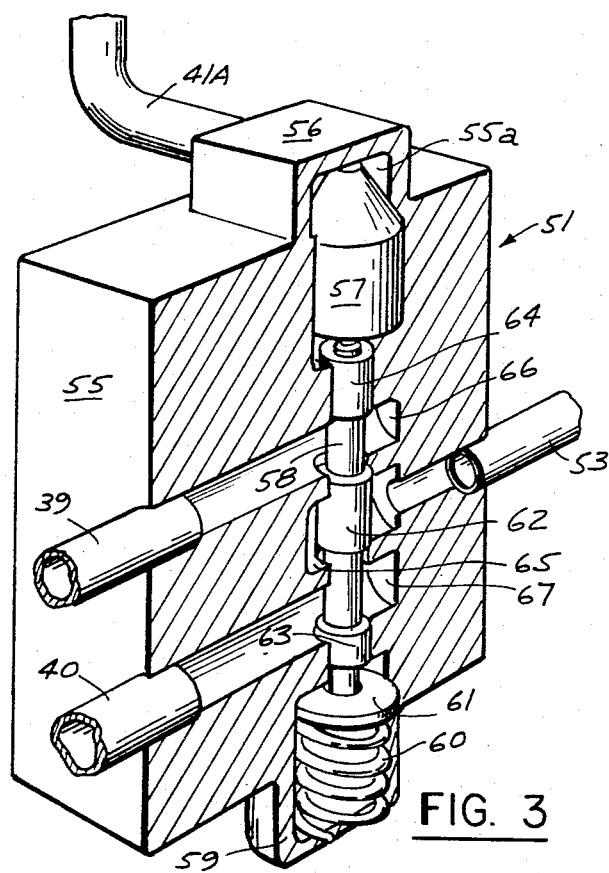
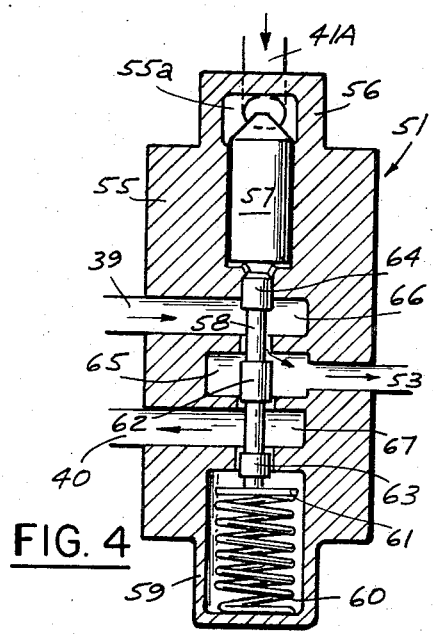

# United States Patent Office 3,365,013
Patented Jan. 23, 1968

3,365,013
STEERING DEVICE FOR TRACK-LAYING
VEHICLES
Lars Olof Lundin and Nils Olov Johansson, Karlskoga,
Sweden, assignors to Aktiebolaget Bofors, Bofors,
Sweden, a corporation of Sweden
Filed Sept. 1, 1965, Ser. No. 484,248
Claims priority, application Sweden, Sept. 4, 1964,
10,613/64
4 Claims. (Cl. 180—6.44)

ABSTRACT OF THE DISCLOSURE

A steering device for steering a track-laying vehicle such as a combat vehicle. A power drive is coupled to both tracks of the vehicle for driving the tracks with a uniform driving force. Steering of each of the tracks is effected by a clutch interposed between the common power drive and the respective track, and a brake interposed between the clutch and the power drive, the clutches being normally engaged and the brakes being normally released. A control assembly for the steering means of each track permits disengagement of the respective clutch and application of the respective brake to effect turning of the vehicle in the desired direction. A booster valve effects, when operated, rapid disengagement of the respective clutch to avoid wear and tear on the same. The control assembly includes a control member which, when moved through a selected distance, leaves the booster valve inoperative and when moved through a second distance activates the booster valve for rapid disengagement of the respective clutch.

---

The present invention relates to a steering device for steering a track-laying vehicle having two tracks, particularly for steering a vehicle of this kind designed to travel at a high speed.

The invention is particularly advantageous for use on combat vehicles such as weapons carriers or armored tanks, the guns or missile launching devices of which must be partly or completely aimed in traverse by turning the entire vehicle, and also for use on vehicles which may be required to make wide and rapid changes in the direction of travel. The standard arrangement for track-laying vehicles of the kind above referred to is to provide for each of the two tracks of the vehicle a driving gear or a wheel driven by a suitable motor and to steer the vehicle by driving one or the other of the tracks, depending upon the direction into which the vehicle is to be turned. Steering of the vehicle in this manner may be sufficient if the vehicle is used to mount earth-moving equipment, but it is not sufficient when the vehicle is used as a combat vehicle which is aimed in the traverse by turning the entire vehicle.

Copending application Ser. No. 452,733, filed May 3, 1965, of the assignee of the applicants herein, describes a steering device which permits a highly accurate and reliable steering of a track-laying vehicle. Broadly, the steering device according to the aforesaid prior application provides an auxiliary driving means which, when operated, overrides the driving gears or wheels by applying an additive or subtractive driving force to the main driving force applied to the tracks by the driving wheels or gears thereby causing a turning of the vehicle into the desired direction and through a desired accurately controllable angle.

As it is evident, the velocity with which a track-laying vehicle can be turned is limited by the friction between the tracks thereof and the nature of the ground upon which the tracks travel. In other words, the tracks will begin to slip when the velocity of the turning of the vehicle exceeds a maximum value which, of course, will vary with changes in the frictional grip of the tracks with the ground.

While a steering device as disclosed in prior application Ser. No. 452,733 provides a highly accurate turning control of the vehicle, it does not permit a very rapid turning of the vehicle and a capability of very rapid turning may be of crucial importance for a combat vehicle to meet a sudden change in the tactical situation in which the vehicle may be involved.

A second copending application Ser. No. 473,635, filed July 21, 1965, of applicants' assignee, discloses a steering device for a track-laying vehicle of the general kind above referred to which combines the accuracy of the steering device according to the first mentioned prior application with a capability of making rapid and wide turns.

The steering device of the second copending application provides a clutch between each track of the vehicle and the main drive means therefor and a brake between each clutch and the respective track. As it is readily apparent, suitable manipulation of the clutches and the brakes, such as strongly braking the main driving force acting upon one of the tracks while leaving unchanged the main driving force acting upon the other track, will cause a rapid but coarsely controlled turning of the vehicle in the desired direction. The aiming of the vehicle in the new direction is then completed by means of the precision steering device disclosed in the aforementioned first copending application.

A third copending application Ser. No. 480,661, filed Aug. 18, 1965, of applicants' assignee, discloses a steering device for a track-laying vehicle of the general kind above referred to which permits precision traversing according to the first mentioned prior application and also sudden and wide changes in the course of the vehicle in accordance with the second copending application by operating a single control means. More specifically, the third copending application provides a single control means which, when moved through a predetermined distance in reference to a neutral position, will effect traversing of the vehicle with a high degree of accuracy by activating the precision control means of the first mentioned prior application and when moved beyond said first distance in reference to the neutral position will effect a rapid and wide change in the course of the vehicle by activating the control means of the second mentioned prior application.

The control means of the second prior application function in a manner such that the respective clutch, which is normally engaged, is gradually disengaged and the respective brake is gradually applied.

Extensive tests have shown that the gradual disengagement of the clutch and the gradual application of the brake while the clutch is still partly in engagement, result in a rather heavy wear and tear on the clutch and also has an adverse effect upon the braking action and thus the steering action which is a function of the braking action. As it is evident, the braking force will be applied in opposition to the driving force of the engine of the motor of the vehicle when and while the clutch is still partly engaged.

It is a broad object of the present invention to provide a novel and improved steering device for a track-laying vehicle of the general kind above referred to which permits a full utilization of the available braking force thereby correspondingly increasing the steering function and which also substantially eliminates the heavy wear on the clutch which occurs when and while the same is still partly engaged at the time the braking force is being applied.

A more specific object of the invention is to provide a novel and improved steering device for a track-laying vehicle of the general kind above referred to in which the clutch is rapidly, that is, practically instantly disengaged when the steering device is operated to effect a rapid turning of the vehicle. Such an arrangement of the steering device does not only reduce heavy wear on the clutch but makes practically the entire control range of the steering device available for steering action by manipulating the brake.

The aforepointed-out objects, features and advantages of the invention and other objects, features and advantages which will be pointed out hereinafter are obtained by providing in addition to the steering means and control means for disengaging the clutch means and applying the brake means when desired, booster means which act upon the clutch means so as to effect a rapid disengagement thereof prior to the application of the brake means to any significant extent. More specifically, the improved steering device of the invention provides a booster valve assembly which, when operated, supplies to a hydraulic system of the clutch means pressure such that the clutch means are practically instantly moved into the disengaged position. The steering device is preferably so arranged that a control member thereof, when moved from a neutral position through a predetermined distance will not act upon the booster valve means but when moved beyond this distance a very short further distance, it will apply to the hydraulic system for operation of the clutch means the aforementioned high fluid pressure. In this connection, it should be mentioned that during the first distance of movement of the control member during which the booster valve means remains inactive, the precision control means according to the aforesaid first prior application are operated.

The invention will be more fully described in connection with the accompanying drawing which shows a preferred embodiment of a steering device according to the invention by way of illustration and not by way of limitation.

In the drawing:

FIG. 2 is a diagrammatic view of the steering device;

FIG. 3 is a perspective detailed view of a valve assembly of the device on an enlarged scale, the valve assembly being shown in a rest or inactive position; and FIG. 4 is a sectional diagrammatic view of the valve assembly shown in FIG. 3, the valve assembly being shown in an operative position.

Figure 1:
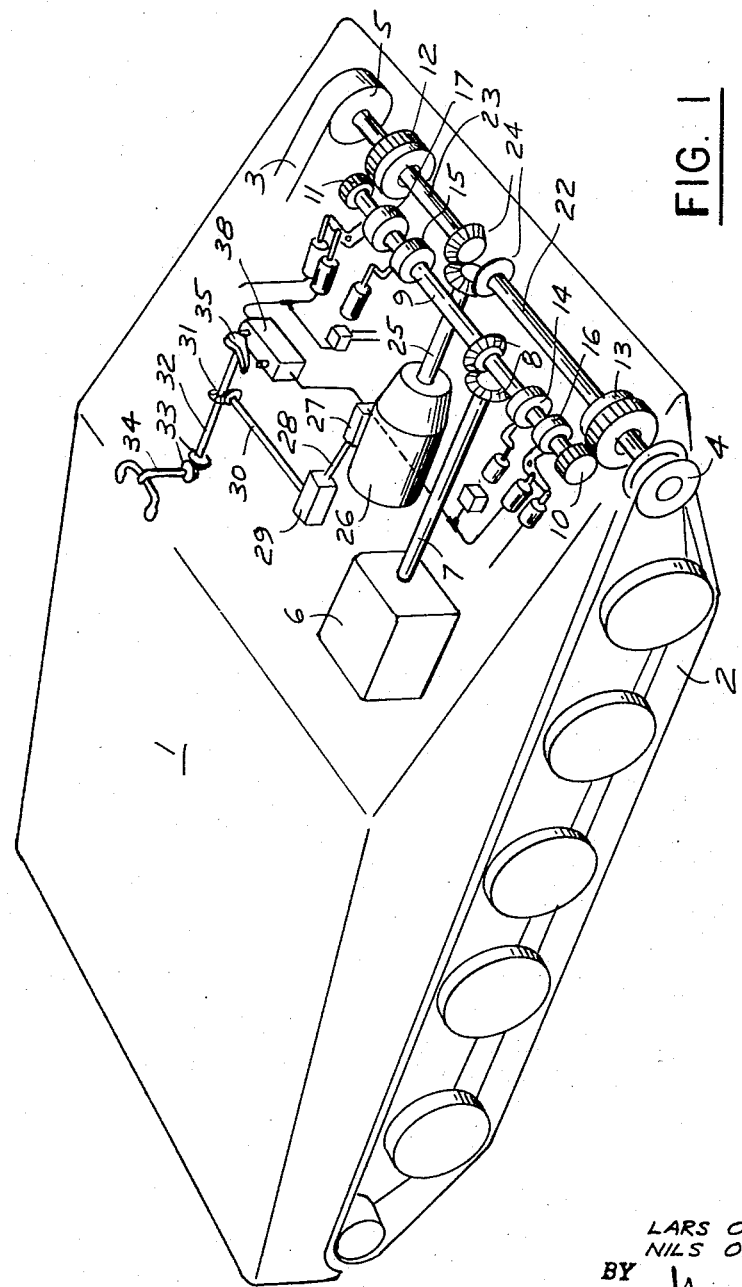
FIG. 1 is a perspective diagrammatic view of a track-laying vehicle equipped with a steering device according to the invention.

Referring first to FIGS. 1 and 2 in detail, the track-laying vehicle and more specifically the chassis 1 thereof is shown only to the extent necessary for the understanding of the invention. The vehicle is driven in a conventional manner by track chains 2 and 3 which, in turn, are driven by means of driving gears or wheels 4 and 5. The driving force for the wheels is derived from a suitable engine, such as a diesel or gasoline internal combustion engine (not shown) mounted on the chassis in a conventional manner, via a gear box 6, a shaft 7, bevel gears 8 and a shaft 9. Shaft 9 mounts at its ends gears 10 and 11 which are in mesh with gears 13 and 12, respectively. The latter gears are only diagrammatically shown and may be visualized as being planetary gears of suitable and conventional design. The two gears 13 and 12 are drivingly coupled with driving wheels 4 and 5 respectively. An auxiliary or controlling driving force is supplied to gears 12 and 13 via shafts 23 and 22. These two shafts are drivingly coupled by bevel gears 24 to a common shaft 25. This shaft, in turn, is connected to an auxiliary driving means shown as a hydraulic or hydrostatic driving means including a motor part 26 and a bevel gear part 24. These two parts are controllable by a pivotal control member 34 via a link 28, a transmission 29, a shaft 30, bevel gears 31, shaft 32 and bevel gears 33. Shaft 32 supports a two-armed lever 35 fixedly secured to the shaft for pivotal movement in unison therewith.

The steering action of the auxiliary driving force upon gears 12 and 13 is fully described in aforementioned first copending application Ser. No. 452,733 of May 3, 1965.

Lever 35 coacts with two lengthwise displaceable control pins or elements 36 and 37 of two control means such as valve assemblies 38, one for each track. Pins 36 and 37 are disposed in positions in reference to control lever 35 such that either arm of this lever can engage the respective pin 36 or 37 only when the control member 34 is tilted through a predetermined angle in reference to its neutral position. The neutral position of member 34 is presumed to be the one shown in FIG. 2, that is, the position in which the member is in an up-and-down position.

Each valve assembly 38 is connected with the pressure side of a hydraulic pressure supply system (not shown) via a pressure inlet pipe 39. Pressure is discharged from the valve assemblies via an outlet pipe 40. The valve assemblies are further connected via pipes 41 and 42 with hydraulic control systems 44 and 46 respectively for operating the steering brakes 17 and 16 respectively, that is, the brakes which are used for effecting rapid turns of the vehicle into the desired direction. The hydraulic control systems of the brakes are more fully shown in the afore-referred to prior applications Ser. No. 473,635, filed July 21, 1965, and Ser. No. 480,661, filed Aug. 18, 1965.

Pipes 41 and 42 are connected to booster means such as control valves 51 and 52 by pipes 41A and 42A branched off from pipes 41 and 42 respectively. Control valves 51 and 52 are connected to hydraulic pressure systems 43 and 45 for control of steering clutches 15 and 14 respectively. These steering clutches are normally engaged and they are disengaged by operation of control valves 51 and 52 as will be more fully described hereinafter. The steering clutches in conjunction with steering brakes 17 and 16 respectively constitute the rapid turning control system which is more fully described and illustrated in the afore-referred to prior application Ser. No. 473,635, filed July 21, 1965, and Ser. No. 480,661, filed Aug. 18, 1965. Control valves 51 and 52 are connected via pressure inlet pipe 39 and pressure outlet pipe 40 with the aforementioned hydraulic pressure supply system.

The control valve 51 is shown in detail in FIGS. 3 and 4. The second control valve 55a should be visualized as being identical with control valve 51 and is hence not illustrated.

Control valve 51 comprises a valve housing 55 (the housing may be common for both control valves). The housing includes a valve chamber 55a in which a plunger 57 is slidable. The housing may have, as it is shown, an extension 56 at its upper end. This extension is preferably integral with the main body of the housing and is connected to branch pipe 41A. A second plunger 58 is slidable within housing 55. This second plunger is aligned with plunger 57 and abuts at one end against the same. The other end of the plunger is subjected to the action of a loaded coil spring 60 via a flange or collar 61. Spring 60 is shown as being accommodated in a bottom extension 59 of housing 55.

Plunger 58 is formed with three lengthwise spaced collars 62, 63 and 64. Collar 62 controls access to a chamber 65 which is connected via pipe 53 with the hydraulic control system 43 for steering clutch 15. Collar 63 controls access to a chamber 67 connected to pressure outlet pipe 40, and collar 64 controls access to a chamber 66 connected to pressure inlet pipe 39.

Collar 62 is so disposed that when valve 51 is in its inactive or neutral position, that is, in the position of FIG. 3, chambers 67 and 65 are in communication with each other. As a result, outlet pipe 41 and pipe 53 are connected and no operating pressure is supplied to the hydraulic control system 43 of steering clutch 15. However, if a pressure impulse is supplied to valve chamber 58 via pipe 41A from valve assembly 38 by pivoting control member 34, plunger 57 and with it plunger 58 are downwardly displaced into the position of FIG. 4 against the action of spring 60. A connection is now established between pressure inlet pipe 39 and pipe 53 as it is indicated by the arrows in FIG. 4 and the connection between pipe 53 and outlet pipe 40 is closed off by collar 62. Clutch 15 is accordingly operated by its hydraulic control system 43.

As it is evident, the loading of spring 60 can be readily so selected that a comparatively low pressure impulse through pipe 41A will displace plungers 57 and 58 to an extent such that practically the full pressure available in the hydraulic pressure supply system is fed via pipe 39 to pipe 53, thereby causing a practically instant complete disengagement of normally closed clutch 15.

As previously stated, the function of valve assemblies 38 for the purpose of effecting a rapid turning of the vehicle by suitable manipulation of the steering clutches and brakes by means of control member 34 is more fully described in copending application Ser. No. 473,635, filed July 21, 1965. As is apparent, the flow of pressure fluid through pipe 41 and 42 depends upon the extent to which control pin 36 or 37 is depressed. With an arrangement in which a comparatively low pressure impulse from one of the valve assemblies 38 is sufficient to feed substantially the maximum available hydraulic pressure to hydraulic control system 43 or 45 and thus to cause a rapid complete disengagement of the respective clutch, a comparatively large pressure range is made available for controlling the hydraulic pressure systems 44 and 46 for operating steering brakes 17 and 16 respectively.

Such an arrangement is of particular advantage in steering systems in which part of the available pivotal movement of the common control member 34 is reserved for a steering function which is independent of the steering function by means of the steering clutches and brakes. As has been explained before, pivoting of control member 34 through a predetermined first distance or range closest to its neutral position does not have any affect upon either of the valve assemblies 38, but controls the precision steering action via motor part 26 and shaft 25.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

We claim:
1. A steering device for steering a track-laying vehicle having two tracks, said device comprising:
   a main drive means drivingly coupled with both tracks of said vehicle for driving the tracks with a uniform driving force;
   a main steering means for each of said tracks, each of said steering means including a clutch means interposed between the respective track and the main drive means and a brake means interposed between the respective clutch means and the main drive means, said clutch means being normally engaged and said brake means being normally released;
   a control means for each of said main steering means, each of said control means when operated activating the respective steering means for disengaging the clutch means and applying the brake means;
   an auxiliary steering means operable by said control means for each of the tracks, each of said auxiliary steering means including a drive means coupled with the respective track to superimpose a steering driving force upon the driving force applied to said track by the main drive means; and
   a booster means for each of said main steering means, each of said booster means upon operation thereof effecting a rapid disengagement of the respective clutch means;
   each of said control means including a control member movable from a neutral position into a first and a second operational position, movement of said member from the neutral position into the first operational position operating said auxiliary steering means and leaving said booster means inoperative for operating the clutch means and movement of said member from the first operational position toward the second operational position operating the booster means for rapid disengagement of the respective clutch means.

2. A steering device for steering a track-laying vehicle having two tracks, said device comprising:
   a main drive means drivingly coupled with both tracks of said vehicle for driving the tracks with a uniform driving force;
   a hydraulically operated main steering means for each of said tracks, each of said main steering means including a clutch means interposed between the respective track and said main drive means and a brake means interposed between the respective clutch means and said main drive means, said clutch means being normally engaged and said brake means being normally released;
   a control means for each of said steering means to control the flow of hydraulic pressure fluid thereto, activation of either of said control means causing a release of the respective clutch means and a gradual application of the respective brake means;
   an auxiliary steering means operable by said control means for each of the tracks, each of said auxiliary steering means including a drive means coupled with the respective track to superimpose a steering driving force upon the driving force applied to the track by the main drive means; and
   a booster valve means interposed between each of said control means and the respective clutch means, each of said booster valve means when operated opening an increased flow of pressure fluid to the respective clutch means to effect a rapid disengagement thereof;
   each of said control means including a control member movable from a neutral position into a first and a second operational position, movement of said member from the neutral position into the first operational position operating said auxiliary steering means and leaving said booster valve means inoperative for operating the clutch means and movement of said member from the first operational position towards the second operational position operating the booster valve means for rapid disengagement of the clutch means.

3. A steering device according to claim 2, wherein each of said booster valve means comprises a valve housing including a chamber, a first plunger slidable in said housing chamber, said control means being connected with said housing chamber on one side of the plunger therein for feeding pressure fluid into the housing chamber when said control member is moved beyond the first operational position thereof, a second plunger slidable in said housing chamber in alignment with the first plunger and adjacent to the other side thereof, said housing chamber being connected adjacent to said other side of the first plunger to a conduit leading to the respective clutch means, to an inlet conduit for hydraulic pressure fluid and to an outlet conduit for the hydraulic pressure fluid, said second plunger in one position in the housing chamber connecting the conduit leading to the clutch means with the outlet conduit and in another position with the inlet conduit, and spring means biasing the second plunger into abutment with said other side of the first plunger and into said one position, application of hydraulic pressure fluid to said one side of the first plunger moving the second plunger into said other position against the action of the spring means.

4. A steering device according to claim 3, wherein said spring means is disposed within the housing between the end of the second plunger opposite to the first plunger and an end wall of the housing.

References Cited

UNITED STATES PATENTS 2,897,787  8/1959  Kivisto et al. ------ 180—6.7 X
2,961,057  11/1960  Johnson ------------ 180—6.2

LEO FRIAGLIA, *Primary Examiner.*

BENJAMIN HERSH, *Examiner.*

J. A. PEKAR, *Assistant Examiner.*